United States Patent [19]

McCourtney

[11] Patent Number: 5,203,650
[45] Date of Patent: Apr. 20, 1993

[54] METHOD AND APPARATUS FOR DRILLING HOLES

[75] Inventor: Dennis C. McCourtney, Davison, Mich.

[73] Assignee: Everett D. Hougen, Flint, Mich.

[21] Appl. No.: 819,313

[22] Filed: Jan. 9, 1992

[51] Int. Cl.$^5$ ............................................. B23B 35/00
[52] U.S. Cl. .................................... 408/1 R; 408/14; 408/16
[58] Field of Search ................. 408/1 R, 8, 9, 10, 12, 408/15, 14, 16, 136

[56] References Cited

U.S. PATENT DOCUMENTS

| | | | |
|---|---|---|---|
| 2,356,438 | 8/1944 | Wilson | 408/16 |
| 2,747,154 | 5/1956 | Abrams . | |
| 2,909,082 | 10/1959 | Booth | 408/14 |
| 3,516,327 | 6/1970 | Wilson | 408/8 |
| 3,724,964 | 4/1973 | Needham, Jr. | 408/16 |
| 3,837,757 | 9/1974 | Levine | 408/136 |
| 4,753,556 | 6/1988 | Solko . | |
| 4,911,587 | 3/1990 | Stych . | |

FOREIGN PATENT DOCUMENTS

| | | | |
|---|---|---|---|
| 3206354 | 9/1983 | Fed. Rep. of Germany | 408/12 |
| 903290 | 9/1945 | France | 408/16 |

*Primary Examiner*—Daniel W. Howell
*Attorney, Agent, or Firm*—Dykema Gossett

[57] ABSTRACT

A method and apparatus is disclosed for drilling holes, each having a substantially similar and desired depth. Apparatus 10 includes a limit switch 42 which deactivates motors 20 and 33 and light 34 when the drill motor's travel has reached a predetermined point and correspondingly the drill bit has reached a desired depth.

9 Claims, 3 Drawing Sheets

METHOD AND APPARATUS FOR DRILLING HOLES

BACKGROUND OF THE INVENTION

1. Field of the Invention.

This invention relates to a method and apparatus for drilling holes and, more particularly, to a method and apparatus for easily adjusting and setting a depth sensing and signaling mechanism for use when drilling holes having substantially similar depths.

2. Discussion.

Drill presses are used in a wide variety of applications to form or create holes or openings in an object. For example, a rail-type drill press is adapted to form holes in the ends of railway tracks in order to allow fish plate bolts or other types of fasteners to be put through the drilled holes, thereby securing the railway ends together. Additionally, for example, drill motors mounted on a slide mechanism are used to form precisely aligned holes in many other types of objects as well.

In order to reduce the operator effort and to minimize the drilling time required, drill presses, including rail type drill presses, have been equipped with power feed devices which incorporate automatic stops. Many of these drill presses have adequately formed holes, but have not provided an easy method for adjusting the stop when the work-piece, the tool bit and the adjustment mechanism are not readily visible to the operator.

For example, prior depth indicating or stop mechanisms, such as disclosed in U.S. Pat. No. 3,724,964 and U.S. Pat. No. 4,909,683, require that the operator measure the depth required by some means and then transfer the required measurement to a setting of the depth stop in relation to a scale mounted in conjunction with the depth stop mechanism. This requires that the operator be able to clearly see the work area and the adjustment mechanism, or rely on trial and error methods which would be time consuming and likely result in defective holes.

This is a particular problem with rail-type drill presses and magnetic base drill presses. Rail-type drill presses are clamped to a rail of a railroad track and the clamping device as well as the drill press' proximity to the ground make adjustment very difficult. Magnetic base drill presses are commonly used to drill holes in metal, such as for example in metal beams in bridges or high rise buildings, etc. These drill presses include a base having an electro-magnet which is magnetically adhered to the metal beam and then the drill motor is moved toward the beam to drill a hole. Because of the versatility of these magnetic base drill presses, they can be mounted vertically, overhead, etc. making it difficult to adjust the automatic stop.

SUMMARY OF THE INVENTION

It is therefore a primary object of this invention to provide a method and apparatus for quickly drilling holes having substantially similar and desired depths.

It is another object of this invention to provide a method and apparatus for providing an indication, for example visual or audible, of the proper adjustment of the automatic stop or depth sensing mechanism of the drill.

It is yet a further object of this invention to provide a method and apparatus to sense the travel of the drill motor of the drill press and to deactivate the drill motor each time the drill motor travels the same distance.

According to the teachings of a first aspect of the present invention, a drill press is provided which is adapted to create a hole of a certain and selectable depth. The drill press includes a limit switch means for selecting a certain travel distance of the drill motor of the drill press which will allow a certain depth. This limit switch prevents the drill from traveling a distance greater than that selected and consequently, from creating a hole having a depth other than the certain and selected depth. A signalling means is provided and coupled to the limit switch means for providing an indication when the distance of travel has been properly set.

According to a second aspect of the present invention, a method is provided for drilling a first and subsequent holes, with each hole having substantially similar depths associated therewith or to ensure that the drill motor travels an equal distance for each hole drilled. Each is accomplished by having the drill motor travel a substantially equal distance each time it forms a hole. The method comprises the steps of drilling the first hole to the desired depth, sensing the depth of the first hole and limiting the drill motor's travel to corresponds to that depth, providing an indication when the drill motor's travel substantially corresponds to the sensed depth and preventing further drilling when the desired depth is reached. This ensures that the sensed depth of the second hole or the amount of drill motor travel is substantially similar to the desired depth of the first hole or the previous drill motor travel.

BRIEF DESCRIPTION OF THE DRAWINGS

Various advantages of the present invention will become apparent to those skilled in the art by reading the following specification, and by reference to the following drawings in which.

DESCRIPTION OF THE PREFERRED EMBODIMENT OF THIS INVENTION

Figure 1:
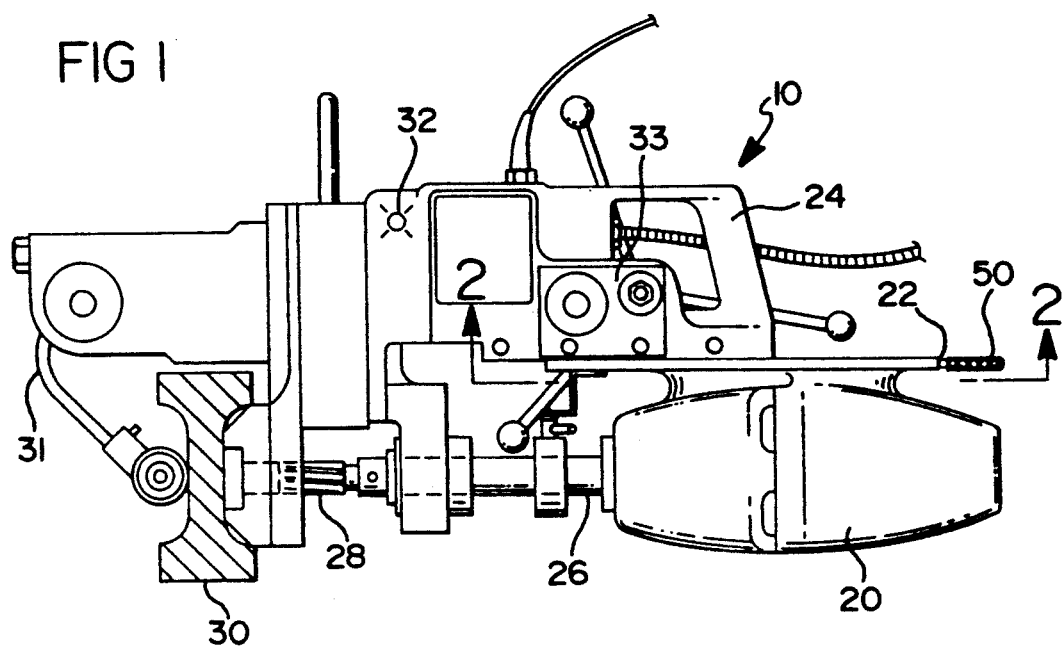
FIG. 1 is a side view of a rail drill embodying the construction of the present invention.

Referring now to FIG. 1, there is shown a typical rail drill 10 as manufactured and sold by Hougen Mfg. Inc. of Flint, Mich. which is illustrated having the construction of the preferred embodiment of this invention.

As shown, drill 10 includes an electric motor 20, which is mounted by a slide 22 onto a body 24, and which includes a drill spindle 26 adapted to support at its free end a drill bit 28. As will be understood by those ordinary skill in the art, motor 20 is adapted to rotate bit 28 as the bit is forced against rail 30 by slide 22. In this manner, rotating bit 28 is made to form or create a hole within rail 30, after drill 10 is properly positioned against rail 30 by use of clamp 31.

Figure 4:
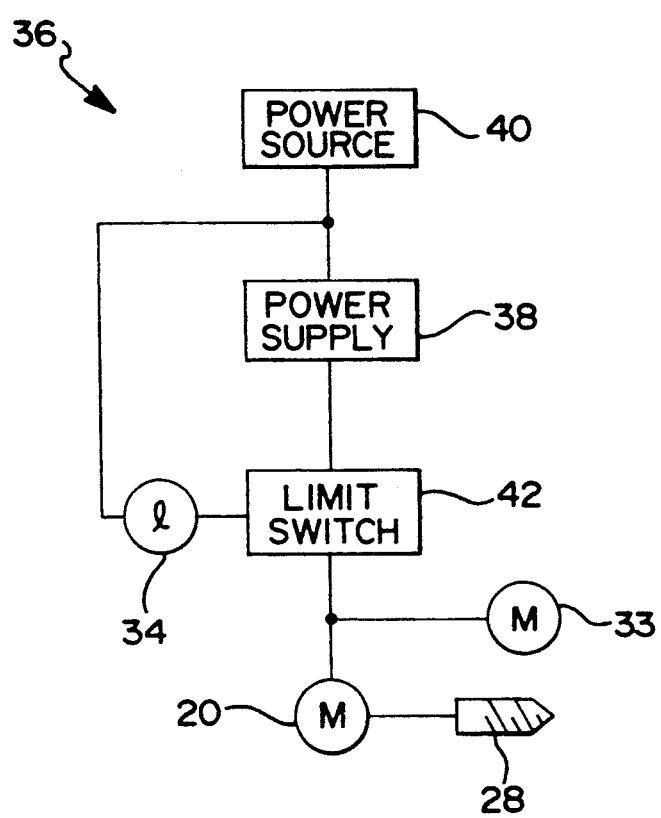
FIG. 4 is an electrical schematic diagram of the rail drill shown in FIG. 1.

To more fully understand the teachings of the preferred embodiment of this invention, attention is now directed to FIG. 4 where there is shown an electrical schematic diagram 36 of drill 10. As shown, motor 20 has an output rotatably coupled to drill bit 28. An electrical power source 40 is coupled to a power supply 38 which includes a switch means. As understood by those of ordinary skill in the art, motors 20 and feed motor 33 are adapted to receive electrical power from supply 38 and, in response to the received power, rotate bit 28 and advance slide 22 (shown in FIG. 1) respectively. Additionally, light 34 is coupled between power source 40 and limit switch 42 and is adapted to illuminate when limit switch 42 is in its normally closed position.

Figure 2:
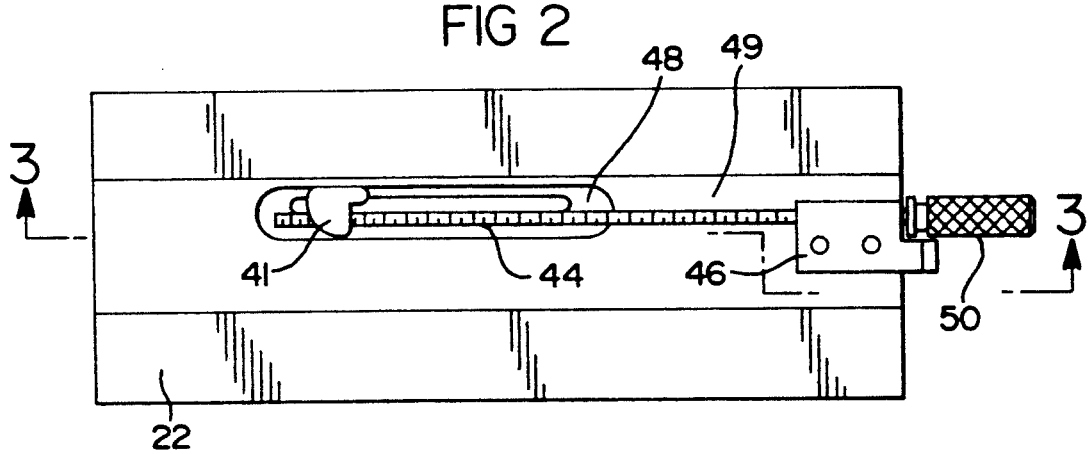
FIG. 2 is a view taken in the direction of the arrows along the view line 2—2 of FIG. 1.
Figure 3:
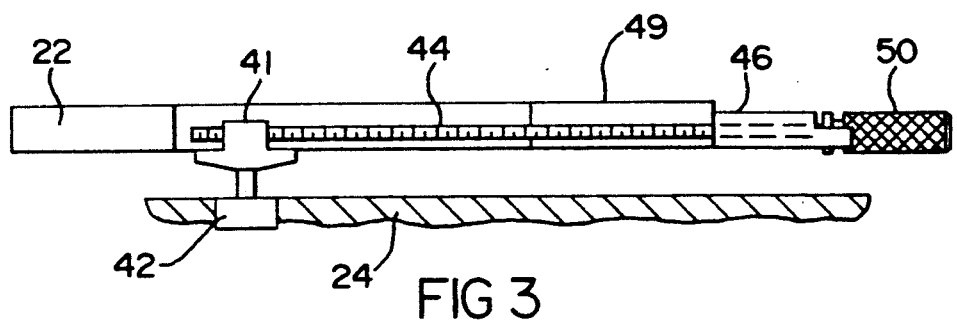
FIG. 3 is a view taken in the direction of the arrows along the view line 3—3 of FIG. 2.

As further shown in FIG. 4, and in accordance with the teachings of the preferred embodiment of this invention, limit switch 42 has an input coupled to the output of power supply 38. In this manner, limit switch 42 may selectively prevent the transfer of electrical power from supply 38 to motors 20 and 33. The positioning of limit switch 42 onto drill 10 will now be explained with reference to FIGS. 2 and 3. FIGS. 2 and 3 illustrate a travel limiting system 49 comprising knob 50, lead screw 44, cam 41, and limit switch 42.

As shown, a lead screw 44 is rotatably mounted upon slide 22 by means of support block 46. Cam 41 is positioned within slide groove 48 and movably mounted upon lead screw 44 by means of internal threads. As will be understood by those of ordinary skill in the art, cam 41 traverses groove 48 in response to rotation of lead screw 44 by handle 50. In this manner, cam 41 may be placed at a desired position within groove 48 so as to alter the relative position of slide 22 with respect to body 24 when cam 41 contacts limit switch 42 and causes limit switch 42 to open.

Figure 5:
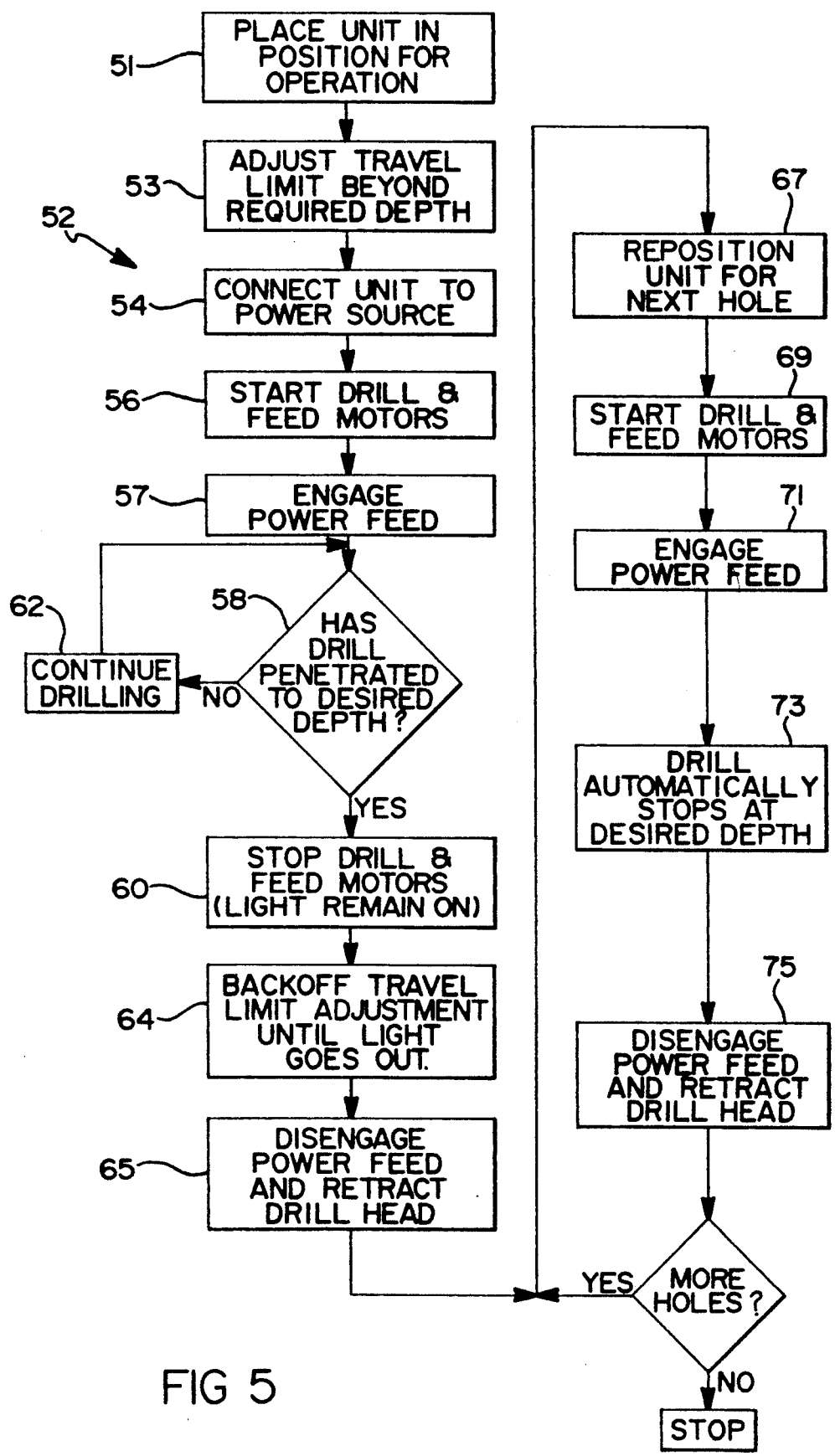
FIG. 5 is a flow chart illustrating the sequence of steps associated with the operation of the rail drill shown in FIG. 1.

Referring now to FIG. 5, there is shown a flow chart 52 illustrating the sequence of steps associated with the preferred embodiment of this invention. An initial step is to place the unit in position for operation, this is shown as step 51. Thereafter, as illustrated, or before if desired, the travel limit 49 is adjusted. See step 53. During these initial steps, power supply 38, in step 54, is connected to power source 40. This connection, as discussed earlier, causes the illumination of light 34 as long as limit switch 42 is closed. Step 54 is then followed by step 56, in which motors 20 and 33 are started in response to the electric power transferred to them by power supply 38 which causes bit 28 to rotate. Either instantaneously or shortly thereafter, step 57 is done which engages a clutch means and causes drill bit 28 to move toward, engage and drill a hole in rail 30.

Step 57 is followed by step 58, in which the drill operator determines if the drill has created a first hole of a desired depth or if the drill motor has travelled a desired distance. When this desired depth has been achieved, step 58 is followed by step 60, in which power is prevented from being supplied to motor 20 and feed motor 33 from supply 38 by the operator manually deactivating the switch means of power supply 38.

Step 60 is then followed by step 64, in which cam 41 is adjusted by means of handle 50 such that it contacts and opens limit switch 42. This contact, as will be understood by those of ordinary skill in the art, causes light 34 to become deactivated, thereby giving the operator a positive visual indication that the limit switch has been properly positioned. This obviates the need for any sort of estimate or "guess" by the operator. After being adjusted, as the drill motor 20 is advanced by feed motor 33, power is supplied until limit switch 42 is engaged by the drill motor's travel which disengages the power to motors 20 and 33. In this manner, all other holes will have substantially the same depth as the first hole since cam 41 is left at this initial setting position, and will cause both motors 20 and 33 to become deactivated or deenergized at the same travel distance each time switch 42 is engaged. This sensing occurs by contact with cam 41.

In this manner, all subsequent holes, formed or created by drill 10 will have substantially similar depths associated therewith. This can be seen in steps 65 through 75. As illustrated, after the steps 51 through 64 are complete, the power feed is disengaged, step 65. The unit is repositioned, step 67, and power is again supplied to start the drill motor and illuminate light 34, step 69. Simultaneously or shortly thereafter, the power feed is engaged, step 71. As shown in step 73, the drill motor and power feed automatically stops at the desired depth. Additionally, the light 34 is deactivated. The power feed is again disengaged, step 75, and if more holes are desired, steps 67 through 75 are repeated.

It is to be understood that the invention is not limited to the exact construction or method illustrated and described above, but that various changes and modifications may be made without departing from the spirit and scope of the invention. For example, the invention is not limited to a rail drill but may be used on any drill press, such as for example, it could be adapted to a conventional drill press which is positioned to a sample part or gauge block etc. and then the limit switch is set to ensure repeated consistent drilling of holes. The indicating means may be audible or an illuminating means or some other indicator. A sliding means could be used on the drill press instead of the screw adjustment means. The drill motor and power feed device may by hydraulic or pneumatic etc. The power feed could be powered by the same motor that powers the spindle, and in some instances the device may be beneficial on hand powered drill presses, it being preferred however, to be used on power fed drill presses.

I claim:

1. A drilling apparatus for creating a first and subsequent holes in an object, said first and subsequent holes each having substantially similar depths associated therewith, said apparatus comprising:

a motor, having an input electrically coupled to a source of electrical power and having a rotating output coupled to a drill bit, said motor being slidably mounted upon said drilling apparatus and adapted to be moved to a hole forming position in order to allow said drill bit to penetrate said object so as to form said first hole therein;

signaling means connected to said source of electrical power; and travel limit means, adjustably disposed upon said drilling apparatus and coupled to said signaling means and to said motor, said travel limit means being adapted to be moved upon said drilling apparatus after said first hole is formed, for selectively breaking said connection between said signaling means, said source of electrical power and said motor and for ensuring that said depth of said subsequent holes are substantially similar to said depth of said first hole, said travel limit means comprises a lead screw rotatably coupled to said drilling apparatus;

a limit switch, and a limit switch activator movably disposed upon said lead screw.

2. The drilling apparatus of claim 1 wherein, said drilling apparatus further comprising:

a power supply selectively coupled to said source of electrical power.

3. A method for adjusting a power tool to traverse a predetermined distance said method comprising the steps of:
   a) providing a power tool having a reciprocating means adapted to reciprocate between raised and lowered positions for cutting an object;
   b) providing an adjustable limit switch in the path of said reciprocating means operable to deactivate said reciprocating means when said reciprocating means is at said predetermined distance and adjacent said limit switch;
   c) providing indicating means to visually indicate when said limit switch is properly adjusted to deactivate said reciprocating means at said predetermined distance;
   d) activating and lowering said reciprocating means said predetermined distance;
   e) activating said indicating means;
   f) manually deactivating said reciprocating means after said reciprocating means has traversed said predetermined distance;
   g) adjusting said limit switch until said indicating means is deactivated;
   h) re-activating and lowering said reciprocating means, said limit switch automatically deactivating said reciprocating means when said predetermined distance has been traversed by said reciprocating means.

4. The method of claim 3, wherein said step of adjusting said limit switch includes rotating a lead screw to which said limit switch is mounted.

5. The method of claim 3, wherein said reciprocating means is a drill motor and cutting device.

6. A drill unit comprising a reciprocating drilling means; an adjustable limit switch adapted to deactivate said drilling means after said drilling means has traversed a predetermined distance; and a signaling means to signal when said limit switch has been properly adjusted to deactivate said drilling means at said predetermined position, said drilling means being adapted to be activated and to initially traverse a predetermined distance with said signalling means activated, said signaling means being adapted to remain activated after said drilling means has traveled said predetermined distance and thereafter to be deactivated by adjustment of said limit switch to a position corresponding to said predetermined distance whereby said limit switch can be accurately adjusted after said initial traverse of said drilling means to control said drilling means such that said drilling means can repeatedly traverse the same distance and be deactivated at the predetermined distance.

7. The drill unit of claim 6, wherein in said limit switch is mounted upon a lead screw rotatably coupled to said drilling apparatus.

8. The drill unit of claim 6, wherein said drilling means is an electric motormounted by a slide onto a body, said electric motor including a drill spindle adapted to support a cutting means.

9. The drill unit of claim 6, wherein said signaling means is an indicator light.

* * * * *